United States Patent
Koch et al.

(10) Patent No.: US 10,160,860 B2
(45) Date of Patent: Dec. 25, 2018

(54) REINFORCED POLYAMIDE MOULDING COMPOSITIONS AND INJECTION MOULDINGS PRODUCED THEREFROM

(71) Applicant: EMS-PATENT AG, Domat/Ems (CH)

(72) Inventors: Felix Koch, Pfäffikon SZ (CH); Philipp Harder, Chur (CH); Botho Hoffmann, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 14/879,731

(22) Filed: Oct. 9, 2015

(65) Prior Publication Data

US 2016/0102203 A1     Apr. 14, 2016

(30) Foreign Application Priority Data

Oct. 10, 2014  (EP) .................................... 14188504

(51) Int. Cl.
*C08L 77/06*    (2006.01)
*C08J 5/00*     (2006.01)

(52) U.S. Cl.
CPC ............... *C08L 77/06* (2013.01); *C08J 5/00* (2013.01); *C08J 2377/06* (2013.01); *C08J 2477/06* (2013.01)

(58) Field of Classification Search
CPC combination set(s) only.
See application file for complete search history.

(56) References Cited

U.S. PATENT DOCUMENTS

| | | | |
|---|---|---|---|
| 2008/0167415 A1* | 7/2008 | Stoeppelmann | C08L 77/00 524/494 |
| 2010/0279111 A1* | 11/2010 | Philipp | C08J 5/043 428/357 |
| 2011/0105655 A1* | 5/2011 | Harder | C08J 5/08 524/101 |
| 2013/0203910 A1 | 8/2013 | Zhang et al. | |
| 2014/0031476 A1 | 1/2014 | Bhatia | |

FOREIGN PATENT DOCUMENTS

| | | |
|---|---|---|
| EP | 0 190 011 A1 | 8/1986 |
| EP | 0 196 194 A1 | 10/1986 |
| EP | 0 199 328 A2 | 10/1986 |
| EP | 0 246 620 A2 | 11/1987 |
| EP | 0 376 616 A2 | 7/1990 |
| EP | 0 400 935 A2 | 12/1990 |
| EP | 1 788 027 A1 | 5/2007 |
| EP | 1 882 719 A1 | 1/2008 |
| EP | 1 942 147 A1 | 7/2008 |
| EP | 2 060 607 A1 | 5/2009 |
| JP | 03269056 A | 11/1991 |
| JP | 10-219026 A | 8/1998 |
| JP | 2004-285487 A | 10/2004 |
| WO | 2014100000 A2 | 6/2014 |

OTHER PUBLICATIONS

Database CA [Online] Chemical Abstracts Service, Columbus,Ohio, US; May 31, 1992, Nakajima, Takashi et al: "Heat-resistant polyamide molding compositions", XP002737289.
European Search Report with Written Opinion of EP 14 18 8504 dated Mar. 17, 2015.

* cited by examiner

*Primary Examiner* — Wenwen Cai
(74) *Attorney, Agent, or Firm* — Sughrue Mion, PLLC

(57) ABSTRACT

A reinforced polyamide molding composition is described, particularly for use as starting material for the production of housings for devices in the field of mobile radio technology, composed of the following components:
(A) from 20-45% by weight of aliphatic polyamide selected from the group consisting of: PA 610, PA 612 and mixtures thereof;
(B) from 5-15% by weight of semiaromatic polyamide selected from the group consisting of: 6I, DI, 6I/6T, 6I/6T, DI/DT, DI/6T, MXD6 and mixtures thereof;
(C) from 45-75% by weight of flat glass fibers with non-circular cross section, where the dimensional ratio of the major cross-sectional axis to the minor cross-sectional axis of the said cross section is in the range from 2-5;
(D) from 0-10% by weight of additives;
where components (A)-(D) give a total of 100% by weight.

18 Claims, No Drawings

REINFORCED POLYAMIDE MOULDING COMPOSITIONS AND INJECTION MOULDINGS PRODUCED THEREFROM

TECHNICAL FIELD

The present invention relates to reinforced polyamide moulding compositions comprising mixtures of preferably low-viscosity polyamides and glass fibres, preferably with flat shape, particularly glass fibres with non-circular cross section, where the dimensional ratio of the major cross-sectional axis to the minor cross-sectional axis of the said cross section is in the range from 2 to 5. The present invention also relates to a process for the production of the polyamide moulding compositions, and also to mouldings manufactured therefrom, particularly injection mouldings.

PRIOR ART

Reinforced polyamides are increasingly important in the field of engineering materials, because they exhibit not only high stiffness but also good toughness and heat resistance. Examples of application sectors are internal and external parts in the automobile sector and in the field of other means of transport, housing material for devices and equipment for telecommunications, consumer electronics, household equipment, mechanical-engineering equipment, equipment in the heating sector, and fastener components for installation work. It is important that parts by way of example used in the automobile sector have metal-like properties, but these are achieved only by highly filled, reinforced moulding compositions. A particularly important factor in the case of thin-walled parts here is that the moulding compositions have high flow path length, but moulding compositions reinforced with continuous fibres cannot achieve this, or can achieve it only with great difficulty.

In other respects, the particular advantage of reinforced polyamides consists in the exceptionally good bond between polymer matrix and reinforcing materials. This remains true at high levels of reinforcement that lead to products with high tensile modulus of elasticity. However, the toughness of the known products does not meet all requirements.

EP-A-0 190 011 describes glass fibres with elliptical or rectangular cross section, and also production thereof. The use of these specific glass fibres for the production of composite parts is mentioned. The relatively large surface area of the fibres gives relatively high strength values in composites.

EP-A-0 196 194 describes a strand composed of a plurality of individual filaments made of glass which have a non-circular cross section, and also production thereof. The cross section of the glass fibres can be oval, elliptical, cocoon-shaped or polygonal.

EP-A-0 199 328 describes a textile for circuit boards which consists essentially of glass fibres with non-circular cross section. The cross section of the individual fibres is oval, elongate or elliptical. Matrices described for the said textile are unsaturated polyester resins, epoxy resins, phenolic resins, polyimide resins and PTFE.

EP-A-0 246 620 describes an article made of a glass-fibre-reinforced thermoplastic, where the cross section of the glass fibres is rectangular, elliptical or cocoon-shaped. Glass fibres with non-circular cross section are shown to have advantages in respect of strength and toughness specifically when the degree of reinforcement is high (60%).

EP-A-0 376 616 describes a thermoplastic polymer composition comprising a thermoplastic and from 1 to 65% of a fibrous reinforcement with non-circular cross section, where the cross-sectional area and the ratio of the cross-sectional axes perpendicular to one another in the reinforcement fibres are characterized in some detail. The contour of the cross section of the reinforcement fibres is arcuate or semicircular. The composition features high dimensional stability and relatively low warpage.

EP-A-0 400 935 describes a flame-retardant fibre-reinforced polyester composition which comprises from 1 to 60% by weight of glass fibres. According to EP-A-0 400 935 the cross-sectional shape of the glass fibres used is selected from the group of oblate, elliptical, oval, semicircular, arcuate and rectangular. These flame-retardant reinforced polyester compositions exhibit reduced deformation, without any disadvantageous effect on their intrinsic mechanical properties of crystalline polyester resins. It is found possible to reduce the deformation, i.e. the warpage, of crystalline polyester resins without impairing the mechanical properties of the resin, for example flexural strength and stiffness, and also without reducing processibility.

According to JP-A-10219026 the warpage of mouldings produced by a thermoplastic process is reduced by using a mixture of glass fibres with circular cross section and glass fibres with flat cross section to reinforce the thermoplastic matrix. The sole example in this document lists polyamide 66 as polymer matrix.

JP-A-2004285487 describes a glass fibre bundle composed of glass filaments with flat cross section which are held together by a non-volatile size, and also a thermoplastic composition composed of from 5 to 75% of these glass fibre bundles and a polyolefin matrix.

EP-A-1 882 719 describes polyamide moulding compositions which exhibit very low warpage together with good mechanical properties. This is achieved through a combination of transparent polyamide with fibrous reinforcing materials and particulate fillers. In principle no restrictions apply to the fibrous reinforcing materials, which are preferably selected from the group consisting of glass fibres, carbon fibres, metal fibres, aramid fibres, whiskers and mixtures thereof. The glass fibres added here can take the form of continuous fibres or of chopped glass fibres. The cross section of the glass fibres can be round, oval or rectangular. Mixtures of aliphatic polyamides with round glass fibres are also used here.

EP-A-1 788 027 describes reinforced polyamide moulding compositions made of a blend of polyamide 66 and copolyamide 6T/6I. A mixture of glass fibres and carbon fibres is used as reinforcing material. In order to obtain a further increase in stiffness, some of the glass fibres are replaced by carbon fibres, and the compounded material used therefore has hybrid-fibre reinforcement. Other materials used are inter alia mixtures of PA66 with amorphous semiaromatic polyamide and round glass fibres. EP-A-1 942 147 discloses polyamide moulding compositions reinforced with flat glass fibres, materials used being inter alia mixtures of polyamide 66 and amorphous semiaromatic polyamide. Problems encountered with these two systems based on mixtures are comparatively high water absorption and reduction of mechanical properties on absorption of water. Systems of this type therefore have only restricted usefulness for applications under wet or moist conditions.

DESCRIPTION OF THE INVENTION

Accordingly, an object of the present invention is inter alia to provide a polyamide moulding composition which has the lowest possible water absorption (preferably less than 2%), and good impact resistance and notched impact resistance, while tensile modulus of elasticity, breaking strength, tensile strain at break and linear shrinkage during injection moulding are approximately at the same level as for a moulding composition based on PA66. The intention is therefore to reduce water absorption in comparison with this standard polyamide 66 and to increase toughness, without impairing other mechanical properties.

This object is achieved via a reinforced polyamide moulding composition according to the invention. Specifically, the present invention therefore provides a reinforced polyamide moulding composition composed of the following components:

(A) from 20-45% by weight of aliphatic polyamide selected from the group consisting of: PA 610, PA 612 and mixtures thereof;
(B) from 5-15% by weight of semiaromatic polyamide selected from the group consisting of: 6I, DI, 6DI, 6I/6T, DI/DT, DI/6T, MXD6 and mixtures thereof;
(C) from 45-75% by weight of flat glass fibres with non-circular cross section, where the dimensional ratio of the major cross-sectional axis to the minor cross-sectional axis of the said cross section is in the range from 2-5;
(D) from 0-10% by weight of additives;
where components (A)-(D) give a total of 100% by weight.

The letter D stands for 2-methylpentane-1,5-diamine, while 6 in the context of this application stands for 1,6-hexanediamine. Correspondingly therefore 6I stands for the polyamide formed by polymerization of 1,6-hexanediamine with isophthalic acid, DI stands for the polyamide formed by polymerization of 2-methylpentane-1,5-diamine with isophthalic acid. Furthermore 6DI stands for the product of the polymerization of 1,6-hexanediamine, 2-methylpentane-1,5-diamine and isophthalic acid, wherein the proportion between 6 and D can be chosen depending on the desired characteristics of the resulting material.

In the same manner, 6I/6T stands for the polymer obtained reacting 1,6-hexanediamine, terephthalic acid and isophthalic acid, wherein the proportions of the terephthalic acid to the isophthalic acid can be chosen depending on the desired characteristics of the resulting material. On the other hand DI/DT stands for the polyamide obtained by reacting methylpentane-1,5-diamine, terephthalic acid and isophthalic acid, where again the proportions of the terephthalic acid and the isophthalic acid can be chosen depending on the desired characteristics of the resulting material.

The above-mentioned system termed DI/6T shall include all kinds of polyamide systems which are based on 1,6-hexanediamine and 2-methylpentane-1,5-diamine forming the diamine fraction and terephthalic acid and isophthalic acid forming the diacid fraction of the starting materials for the polyamide. The proportions within the diamine fraction as well as within the diacid fraction can be chosen depending on the desired characteristics of the resulting polyamide. So considering the formed building blocks this term DI/6T in a more detailed notation stands for systems of the type 6I/DI/6T/DT with proportions of the building blocks depending on the desired characteristics of the resulting material.

It is preferable to use low-viscosity polyamide as component (A) and/or (B). The expression low-viscosity polyamides means a polyamide with solution viscosity $\eta_{rel}$ smaller than 2.0, preferably smaller than 1.9 (in each case solution of 0.5 g of polymer in 100 ml of m-cresol, 20° C.). The relative viscosity $\eta_{rel}$ smaller than 1.9 normally corresponds to a molar mass ($M_n$, number average) smaller than 20 000 g/mol for the polyamides.

It is preferable that the proportion of component (A) is in the range from 22-38% by weight.

The solution viscosity $\eta_{rel}$ of the polyamide of component (A), measured on solutions of 0.5 g of polymer in 100 ml of m-cresol at a temperature of 20° C., is preferably in the range from 1.5-2.0 and particularly preferably in the range from 1.6-1.85.

It is preferable that component (A) is composed exclusively of polyamide PA 612.

The proportion of component (B), on the other hand, is preferably in the range from 7-13% by weight.

It is preferable that component (B) is composed exclusively of at least one of 6I/6T or DI/DT, wherein it is particularly preferred if component (B) is composed exclusively of 6I/6T.

It is preferable that the solution viscosity $\eta_{rel}$ of the polyamide of component (B), preferably of 6I/6T or of DI/DT, measured on solutions of 0.5 g of polymer in 100 ml of m-cresol at a temperature of 20° C., is in the range from 1.45-1.75, preferably in the range from 1.48-1.65.

It is moreover preferable that component (B) is composed exclusively of MXD6 (MXD=meta-xylylenediamine), where the relative viscosity of MXD6, measured in accordance with ISO 307 on 1% solutions in sulphuric acid at 20° C., is preferably in the range from 2.0 to 3.5, particularly preferably in the range from 2.1 to 2.8. MXD6 is per se semicrystalline and has a melting point of about 237° C., but in the moulding composition of the invention does not crystallize or crystallizes only to a small extent, and therefore functions as an amorphous polyamide.

According to one preferred embodiment, the proportion of 6I units in the polyamide 6I/6T of component (B), based on the entirety of the 6T and 6I units, is in the range from 60 to 90 mol %, preferably in the range from 65 to 80 mol %, particularly preferably in the range from 65 to 75 mol %.

According to another preferred embodiment, the proportion of DI units in the polyamide DI/DT of component (B), based on the entirety of the DT and DI units, is in the range from 60 to 90 mol %, preferably in the range from 65 to 80 mol %, particularly preferably in the range from 65 to 75 mol %.

According to another preferred embodiment, the proportion of I containing units in the polyamide DI/6T of component (B), based on the entirety of the T and I containing units, is in the range from 60 to 90 mol %, preferably in the range from 65 to 80 mol %, particularly preferably in the range from 65 to 75 mol %.

Generally it can be said that the ratio of component (A) to component (B) is preferably in the range from 2.7:1 to 5:1, with preference in the range from 2.8:1 to 4:1, particularly preferably in the range from 2.9:1 to 3.1:1.

The proportion of component (C) is preferably in the range from 50-70% by weight.

The dimensional ratio of the major cross-sectional axis to the minor cross-sectional axis of the said cross section of the glass fibre of component (C) is preferably in the range from 2.5-4.5, with preference in the range from 2.8-4.2, particularly preferably in the range from 2.9-3.2.

In the glass fibres of component (C) the length of the minor cross-sectional axis can be in the range from 5-10 μm and the length of the major cross-sectional axis can be in the range from 15-30 μm.

It is preferable that the glass fibres of component (C) are E glass fibres. According to ASTM D578-00, E glass fibres are composed of from 52-62% of silicon dioxide, from 12-16% of aluminium oxide, from 16-25% of calcium oxide, from 0-10% of borax, from 0-5% of magnesium oxide, from 0-2% of alkali metal oxides, from 0-1.5% of titanium dioxide and from 0-0.3% of iron oxide. The density of E glass fibres is from 2.54-2.62 g/cm$^3$, their tensile modulus of elasticity is from 70-75 GPa, their tensile strength is from 3000-3500 MPa, and their tensile strain at break is from 4.5-4.8%, where the mechanical properties were determined on individual fibres with diameter 10 μm and length 12.7 mm at 23° C. and relative humidity 50%.

Component (C) can be glass fibres in the form of chopped glass with length in the range from 1-20 mm, particularly preferably length in the range from 2-5 mm.

Additives from the following group can be selected as component (D): inorganic stabilizers, organic stabilizers, lubricants, dyes, nucleating agents, metal flakes, halogen-containing flame retardants, halogen-free flame retardants, impact modifiers, antistatic agents, conductivity additives, mould-release agents, optical brighteners, adhesion promoters, ageing inhibitors, antioxidants, antiozonants, light stabilizers, UV stabilizers, UV absorbers, UV blockers, inorganic heat stabilizers, in particular based on copper halides and alkali metal halides, organic heat stabilizers, conductivity additives, optical brighteners, processing aids, crystallization accelerators, crystallization retarders, flow aids, lubricants, mould-release agents and mixtures thereof.

The additives (D) used can also be added fibrous materials differing from component (C). Possible examples are carbon fibres, metal fibres, aramid fibres, nanotubes, particularly carbon nanotubes (CNT), whiskers, and also glass fibres with round cross section, and mixtures and surface-treated forms thereof.

Other possible additives (D) are added particulate materials, for example carbon black, silicates, inclusive of natural phyllosilicates, synthetic phyllosilicates, inclusive of iron aluminium silicate particles and/or sodium aluminium silicate particles, metallic pigments, talc, mica, quartz in powdered and other forms, ground glass, ground glass fibres, glass flakes, titanium dioxide, zinc sulphide, wollastonite, kaolin, silicas, magnesium carbonate, manganese hydroxide, chalk, ground or precipitated calcium carbonate, lime, feldspar, barium sulphate, permanent-magnetic or magnetizeable metals or alloys, hollow and solid glass beads, hollow-bead silicate fillers, inorganic pigments, particularly iron oxide, iron manganese oxide, metal powders inclusive of iron powder, copper powder, aluminium powder, metal flakes inclusive of aluminium flakes, iron flakes, metal-coated fillers, metal oxides, inclusive of spinels, particularly copper iron spinel, copper chromium oxide, copper chromite (CuCr2O4), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard and soft magnetic metals and alloys and, respectively, ceramics, hollow-bead silicate fillers, aluminium oxide, boron nitride, boron carbide, aluminium nitride, calcium fluoride and mixtures and surface-treated forms thereof.

The present invention further provides a process for the production of a polyamide moulding composition of the type described above, particularly in a compounding system with a barrel temperature in the range from 260-320° C., characterized in that components (A) and (B), and also optionally polymers of component (D), are preferably first melted and then component (C), and also optionally component (D), is added.

The present invention further provides a use of a moulding composition as described above preferably with water absorption, measured at 23° C. and 100% relative humidity, of less than 2.5%, preferably less than 2%, for the production of mouldings, in particular of injection mouldings.

Finally, the present invention provides a moulding obtained or obtainable from a polyamide moulding composition of the type described above, preferably in the form of a housing, particularly of a housing for a portable device, particularly preferably a tablet computer or other computer, camera, communication device, position-finding device, mobile telephone, phablet (combines functions of smartphone and tablet PC) or parts thereof.

DESCRIPTION OF PREFERRED EMBODIMENTS

Preferred embodiments of the invention are described below with reference to the Examples, which serve merely for illustration and are not to be interpreted as restrictive. The moulding compositions in Tables 1 and 2 were produced in a ZSK 25 twin-screw extruder from Werner and Pfleiderer. The pellets of the polyamides PA A to PA D, and also components (B) and (D), were mixed and fed into the feed zone. The glass fibre (component (C)) was fed into the polymer melt by way of a sidefeeder 3 barrel units upstream of the die.

The barrel temperature was adjusted to give a profile rising up to 280° C. 10 kg of throughput were achieved at from 150 to 200 rpm. The compounded materials were discharged in the form of strand from a die of diameter 3 mm, and pelletized after water-cooling. The pellets were then dried in vacuo at 30 mbar for 24 h at 100° C.

The test samples were produced in an Arburg Allrounder 320-210-750 injection-moulding system, where the cylinder temperatures were adjusted to the range from 260° C. to 300° C., the mould temperature was adjusted to from 90-120° C., and the peripheral velocity of the screw was adjusted to 15 m/min.

PA Type A: Polyamide PA612 with solution viscosity $\eta_{rel}$=1.80 (solution of 0.5 g of polymer in 100 ml of m-cresol, 20° C.) and melting point 217° C., produced by EMS-CHEMIE AG, Switzerland.

PA Type B: Polyamide PA614 with solution viscosity $\eta_{rel}$=1.78 (solution of 0.5 g of polymer in 100 ml of m-cresol, 20° C.) and melting point 210° C., produced by EMS-CHEMIE AG, Switzerland.

PA Type C: Radipol A45, polyamide PA66 with solution viscosity 2.7 (1.0% by weight in sulphuric acid, 20° C., ISO 307), viscosity number 150 (average molar mass about 20 000-21 000 g/mol) and melting point 260° C., RADICI, Italy.

PA Type D: Amorphous polyamide PA6T/6I (33:67) based on TPS, IPS and HMDA, Tg=125° C., $\eta_{rel}$=1.54 (solution of 0.5 g of polymer in 100 ml of m-cresol, 20° C.), ΔHm<4 J/g, produced by EMS-CHEMIE AG, Switzerland.

PA Type E: Polyamide PA610 with solution viscosity $\eta_{rel}$=1.75 (solution of 0.5 g of polymer in 100 ml of m-cresol, 20° C.) and melting point 224° C., produced by EMS-CHEMIE AG, Switzerland.

PA Type F: Polyamide MXD6 with solution viscosity $\eta_{rel}$=1.68 (solution of 0.5 g of polymer in 100 ml of m-cresol, 20° C.) and melting point 240° C., produced by Mitsubishi Gas Chemical, Japan.

PA Type G: Amorphous polyamide PA DT/DI (60:40) based on TPS, IPS and 2-Methylpentanediamine, Tg=145° C., $\eta_{rel}$=1.44 (solution of 0.5 g of polymer in 100 ml of m-cresol, 20° C.), ΔHm<4 J/g, produced by Invista, USA.

Glass fibres: CPIC ECS 301 T, length 3 mm, width 24 µm, thickness 8 µm, aspect ratio of cross-sectional axes=3, CPIC, China (flat glass fibre).

The measurements were made on the following test samples in accordance with the following standards:

If the test samples are used in dry condition, they are stored after the injection-moulding process for at least 48 h at room temperature in a dry environment, i.e. over silica gel. Conditioned test samples are stored in accordance with ISO 1110 for 14 days at 72° C. and 62% relative humidity.

Thermal properties (melting point ($T_M$), enthalpy of fusion ($\Delta Hm$), glass transition temperature (Tg)) were determined with reference to the ISO Standard 11357-1/-2/-3 on pellets. Differential scanning calorimetry (DSC) was carried out with heating rate 20° C./min.

Relative viscosity ($\eta_{rel}$) was determined in accordance with DIN EN ISO 307 on solutions of 0.5 g of polymer in 100 ml of m-cresol at a temperature of 20° C. The sample used was pellets.

Tensile modulus of elasticity, breaking strength and tensile strain at break: Tensile modulus of elasticity, breaking strength and tensile strain at break were determined in accordance with ISO 527 at a tensile testing rate of 1 mm/min (tensile modulus of elasticity) and, respectively, 5 mm/min (breaking strength, tensile strain at break) on an ISO tensile specimen, Standard ISO/CD 3167, type A1, 170×20/10×4 mm at a temperature of 23° C.

Impact resistance and notched impact resistance by Charpy method were measured in accordance with ISO 179/keU on an ISO test sample, Standard ISO/CD 3167, type B1, 80×10×4 mm at a temperature of 23° C.

Shrinkage during processing (linear longitudinal/transverse shrinkage during injection moulding) was determined in accordance with ISO 294-4 on a plaque, type D2, 60×60×2 mm (in accordance with Standard ISO 294-3). The plaques were produced with the previously stated melt temperatures and mould temperatures. Before measurement, they were stored for 48 h under standard indoor conditions of temperature and humidity (20° C., 50% rel. humidity).

Shrinkage during processing was determined in relation to the size of the mould cavity, longitudinally and transversely with respect to the direction of flow. The arithmetic average value of measurements on 5 plaques is stated.

Water absorption was determined in accordance with ISO 62 on plaques measuring 80×80×1 mm at a temperature of 23° C. The plaques were stored at 100% relative humidity until no further weight increase occurred.

TABLE 1

| Composition | Unit | | IE1 | IE2 | CE1 | CE2 |
|---|---|---|---|---|---|---|
| PA A (612) | % by wt. | | 37.5 | 33.75 | | |
| PA B (614) | % by wt. | | | | 37.5 | |
| PA C (66) | % by wt. | | | | | 37.5 |
| PA D (6I/6T) | % by wt. | | 12.5 | 11.25 | 12.5 | 12.5 |
| Glass fibre | % by wt. | | 50 | 55 | 50 | 50 |
| Properties | | | | | | |
| Tensile modulus | GPa | d. | 15.5 | 17.5 | 14.8 | 18.0 |
| of elasticity | | c. | 14.5 | 16.4 | 14.2 | 17.0 |
| Tensile strength | MPa | d. | 228 | 243 | 210 | 250 |
| at break | | c. | 198 | 213 | 190 | 220 |
| Elongation at break | % | d. | 3.0 | 3.0 | 3.0 | 2.5 |
| | | c. | 3.2 | 2.9 | 3.0 | 2.5 |
| Impact resistance | kJ/m$^2$ | d. | 100 | 114 | 90 | 71 |
| at 23° C. | | c. | 105 | 104 | 95 | 73 |
| Notched impact | kJ/m$^2$ | d. | 22 | 23 | 16 | 15 |
| resistance at 23° C. | | c. | 21 | 22 | 16 | 15 |
| Linear longitudinal shrinkage during injection moulding | [%] | | — | 0.02 | — | 0.06 |
| Linear transverse shrinkage during injection moulding | [%] | | — | 0.38 | — | 0.48 |
| Water absorption (23° C., 100% rel. humidity) | % | | 1.9 | 1.7 | 1.6 | 4.0 | d. = dry, c.= conditioned

TABLE 2

| Composition | Unit | | IE3 | IE4 | CE3 | IE5 | CE4 | 1E6 |
|---|---|---|---|---|---|---|---|---|
| PA A (612) | % by wt. | | 30 | 26.25 | | 22.5 | | |
| PA E (610) | % by wt. | | | | | | | 33.75 |
| PA C (66) | % by wt. | | | | 30 | | 22.5 | |
| PA D (6I/6T) | % by wt. | | 10 | 8.75 | 10 | 7.5 | 7.5 | 11.25 |
| Glass fibre | % by wt. | | 60 | 65 | 60 | 70 | 70 | 55 |
| Properties | | | | | | | | |
| Tensile modulus of | GPa | d. | 19.6 | 23.5 | 22.5 | 27 | 28 | 17.6 |
| elasticity | | c. | 18.5 | 22.5 | 22 | 26 | 27.5 | 17.3 |
| Tensile strength at | MPa | d. | 253 | 265 | 270 | 265 | 259 | 223 |
| break | | c. | 223 | 240 | 260 | 225 | 260 | 205 |
| Elongation at Break | % | d. | 2.7 | 1.9 | 1.9 | 1.5 | 1.4 | 2.8 |
| | | c. | 2.8 | 1.9 | 2.0 | 1.4 | 1.5 | 3.0 |
| Impact resistance at 23° C. | kJ/m$^2$ | d. | 99 | 85 | 74 | 72 | 58 | 95 |
| | | c. | 118 | 77 | 67 | 70 | 60 | 92 |
| Notched impact resistance | kJ/m$^2$ | d. | 19 | 20 | 15 | 21 | 14 | 21 |
| at 23° C. | | c. | 21 | 22 | 15 | 22 | 15 | 22 |
| Linear longitudinal shrinkage during injection moulding | % | | — | 0.08 | 0.06 | 0.10 | 0.12 | — |
| Linear transverse shrinkage during injection moulding | % | | — | 0.31 | 0.41 | 0.32 | 0.31 | — |
| Water absorption (23° C., 100% rel. humidity) | % | | 1.6 | 1.5 | 3.5 | 1.3 | 2.9 | 2.0 | d. = dry, c.= conditioned

TABLE 3

| Composition | Unit | IE7 | CE5 | IE8 | CE6 | IE9 | CE7 | IE10 |
|---|---|---|---|---|---|---|---|---|
| PA A (612) | % by wt. | | | 37.5 | | | 30 | 37.5 |
| PA E (610) | % by wt. | 37.5 | | | | | | |
| PA C (66) | % by wt. | | 37.5 | | 30 | | 37.5 | |
| PA F (MXD6) | % by wt. | 12.5 | 12.5 | 12.5 | 10 | 10 | | |
| PA G (DI/DT) | % by wt. | | | | | | 12.5 | 12.5 |
| Glass fibre | % by wt. | 50 | 50 | 50 | 60 | 60 | 50 | 50 |
| Properties | | | | | | | | |
| Tensile modulus of elasticity | GPa | 16.1 | 18.1 | 16.0 | 22.4 | 20.8 | 18 | 16.2 |
| Tensile strength at break | MPa | 232 | 261 | 230 | 268 | 249 | 255 | 230 |
| Elongation at Break | % | 2.8 | 2.4 | 2.9 | 2.0 | 2.5 | 2.6 | 3.0 |
| Impact resistance at 23° C. | kJ/m² | 95 | 90 | 100 | 80 | 92 | 70 | 95 |
| Notched impact resistance at 23° C. | kJ/m² | 21 | 20 | 22 | 16 | 19 | 14 | 21 |
| Water absorption (23° C., 100% rel. humidity) | % | 2.2 | 4.0 | 1.9 | 3.4 | 1.6 | 4.1 | 2.0 |

In order to adjust the stiffness of the moulding composition of the invention to that of standard PA66, the proportion of the glass fibre was, in the case of the lower concentrations in the region up to 60% by weight, increased by 5%. When considering the objects addressed it is therefore correct to compare a moulding composition of the invention with a proportion of 55 or 65% of glass fibre with a standard moulding composition comprising only 50 or 60% by weight of glass fibre.

The moulding compositions of IE2 and CE2 have almost identical stiffness and breaking strength. However B2 features markedly better impact resistance and notched impact resistance, and also lower water absorption.

Although the water absorption of CE1 is again reduced by the higher aliphatic content in PA614 in comparison with PA612, impact resistance and notched impact resistance are markedly lower.

The same picture emerges with the higher glass fibre concentrations in comparison of IE4 with CE3 and IE5 with CE4; here again the moulding compositions of the invention have markedly better impact resistance and notched impact resistance for almost identical modulus of elasticity, and water absorption is lower by from 1.6 to 2.0%.

The water absorption of PA 6I/6T (2/1) is 2% by weight at 23° C. and 50% relative humidity and 7% by weight at 23° C. and 100% relative humidity. The amorphous polyamide therefore makes no contribution to the reduction of water absorption.

The invention claimed is:

1. A reinforced polyamide moulding composition consisting of the following components:
   (A) from 30-37.5% by weight of aliphatic polyamide consisting of PA 612;
   (B) from 10-12.5% by weight of semiaromatic polyamide 6I/6T;
   (C) from 50-60% by weight of flat glass fibres with non-circular cross section, where the dimensional ratio of the major cross-sectional axis to the minor cross-sectional axis of the said cross section is in the range from 2-5;
   (D) from 0-10% by weight of additives, selected from the group consisting of: inorganic stabilizers, organic stabilizers, lubricants, dyes, nucleating agents, metal flakes, impact modifiers, antistatic agents, conductivity additives, mould-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials differing from component (C) and particulate materials;
   where components (A)-(D) give a total of 100% by weight.

2. The polyamide moulding composition according to claim 1, wherein the solution viscosity $\eta_{rel}$ of the aliphatic polyamide of component (A), measured on solutions of 0.5 g of polymer in 100 ml of m-cresol at 20° C., is in the range from 1.5-2.0.

3. The polyamide moulding composition according to claim 1, wherein the solution viscosity $\eta_{rel}$ of the polyamide of component (B) measured on solutions of 0.5 g of polymer in 100 ml of m-cresol at 20° C., is in the range from 1.45-1.75.

4. The polyamide moulding composition according to claim 1, wherein the proportion of 6I units in the polyamide 6I/6T of component (B), based on the entirety of the 6T and 6I units, is in the range from 60-90 mol %.

5. The polyamide moulding composition according to claim 1, wherein the dimensional ratio of the major cross-sectional axis to the minor cross-sectional axis of the said cross section of the glass fibre of component (C) is in the range from 2.5-4.5.

6. The polyamide moulding composition according to claim 1, wherein in the glass fibres of component (C) the length of the minor cross-sectional axis is in the range from 5-10 μm and the length of the major cross-sectional axis is in the range from 15-30 μm.

7. The polyamide moulding composition according to claim 1, wherein the glass fibres of component (C) are E glass fibres.

8. The polyamide moulding composition according to claim 1, wherein the solution viscosity $\eta_{rel}$ of the aliphatic polyamide of component (A), measured on solutions of 0.5 g of polymer in 100 ml of m-cresol at 20° C., is in the range from 1.6-1.85.

9. The polyamide moulding composition according to claim 1, wherein the solution viscosity $\eta_{rel}$ of the polyamide of component (B), measured on solutions of 0.5 g of polymer in 100 ml of m-cresol at 20° C., is in the range from 1.48-1.65.

10. The polyamide moulding composition according to claim 1, wherein the proportion of 6I units in the polyamide 6I/6T of component (B), based on the entirety of the 6T and 6I units, is in the range from 65-75 mol %.

11. The polyamide moulding composition according to claim 1, wherein the dimensional ratio of the major cross-sectional axis to the minor cross-sectional axis of the said cross section of the glass fibre of component (C) is in the range from 2.9-3.2.

12. The polyamide moulding composition according to claim 1, wherein the glass fibres of component (C) are E glass fibres, in the form of chopped glass of length in the range from 1-5 mm.

13. The polyamide moulding composition according to claim 1, wherein additives of component (D) are selected from the group consisting of: inorganic stabilizers, organic stabilizers, dyes, nucleating agents, impact modifiers, antistatic agents, conductivity additives, mould-release agents, optical brighteners, adhesion promoters, ageing inhibitors, antioxidants, antiozonants, light stabilizers, UV stabilizers, UV absorbers, UV blockers, copper halide inorganic heat stabilizers, alkali metal halide inorganic heat stabilizers, organic heat stabilizers, processing aids, crystallization accelerators, crystallization retarders, flow aids, lubricants, carbon fibres, metal fibres, aramid fibres, nanotubes, whiskers, glass fibres with round cross section, carbon black, silicates, metallic pigments, talc, mica, quartz in powdered and other forms, ground glass, ground glass fibres, glass flakes, titanium dioxide, zinc sulphide, wollastonite, kaolin, silicas, magnesium carbonate, magnesium hydroxide, chalk, ground or precipitated calcium carbonate, lime, feldspar, barium sulphate, permanent-magnetic or magnetizeable metals or alloys, hollow and solid glass beads, hollow-bead silicate fillers, inorganic pigments, metal powders, metal flakes, metal-coated fillers, metal oxides, hard and soft magnetic metals and alloys thereof, ceramics, hollow-bead silicate fillers, aluminium oxide, boron nitride, boron carbide, aluminium nitride, calcium fluoride, mixtures thereof, and surface-treated forms thereof.

14. The polyamide moulding composition according to claim 1, wherein additives of component (D) are selected from the group consisting of: inorganic stabilizers, organic stabilizers, dyes, nucleating agents, metal flakes, impact modifiers, antistatic agents, conductivity additives, mould-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, lubricants, carbon fibres, metal fibres, aramid fibres, carbon nanotubes (CNT), whiskers, glass fibres with round cross section, carbon black, iron aluminium silicate particles, sodium aluminium silicate particles, metallic pigments, talc, mica, quartz in powdered and other forms, ground glass, ground glass fibres, glass flakes, titanium dioxide, zinc sulphide, wollastonite, kaolin, silicas, magnesium carbonate, magnesium hydroxide, chalk, ground or precipitated calcium carbonate, lime, feldspar, barium sulphate, permanent-magnetic or magnetizeable metals or alloys, hollow and solid glass beads, hollow-bead silicate fillers, iron oxide, iron manganese oxide, iron powder, copper powder, aluminium powder, aluminium flakes, iron flakes, metal-coated fillers, copper iron spinel, copper chromium oxide, copper chromite (CuCr2O4), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard and soft magnetic metals and alloys thereof, ceramics, hollow-bead silicate fillers, aluminium oxide, boron nitride, boron carbide, aluminium nitride, calcium fluoride, mixtures thereof, and surface-treated forms thereof.

15. The polyamide moulding composition according to claim 1, wherein additives of component (D) are selected from the group consisting of: inorganic stabilizers, organic stabilizers, dyes, nucleating agents, metal flakes, impact modifiers, antistatic agents, conductivity additives, mould-release agents, optical brighteners, adhesion promoters, ageing inhibitors, antioxidants, antiozonants, light stabilizers, UV stabilizers, UV absorbers, UV blockers, inorganic copper halide heat stabilizers-, inorganic alkali metal halide heat stabilizers, organic heat stabilizers, processing aids, crystallization accelerators, crystallization retarders, flow aids, lubricants, carbon fibres, metal fibres, aramid fibres, carbon nanotubes (CNT), whiskers, glass fibres with round cross section, carbon black, iron aluminium silicate particles, sodium aluminium silicate particles, metallic pigments, talc, mica, quartz in powdered and other forms, ground glass, ground glass fibres, glass flakes, titanium dioxide, zinc sulphide, wollastonite, kaolin, silicas, magnesium carbonate, magnesium hydroxide, chalk, ground or precipitated calcium carbonate, lime, feldspar, barium sulphate, permanent-magnetic or magnetizeable metals or alloys, hollow and solid glass beads, hollow-bead silicate fillers, iron oxide, iron manganese oxide, iron powder, copper powder, aluminium powder, aluminium flakes, iron flakes, metal-coated fillers, copper iron spinel, copper chromium oxide, copper chromite (CuCr2O4), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard and soft magnetic metals and alloys thereof, ceramics, hollow-bead silicate fillers, aluminium oxide, boron nitride, boron carbide, aluminium nitride, calcium fluoride, mixtures thereof, and surface-treated forms thereof.

16. Mouldings obtained from the polyamide moulding composition according to claim 1.

17. Mouldings obtained from the polyamide moulding composition according to claim 1, in the form of a housing or parts thereof.

18. Mouldings according to claim 17, in the form of a housing for a portable device, a tablet computer or other computer, camera, communication device, position-finding device, mobile telephone, phablet or parts thereof.

* * * * *

UNITED STATES PATENT AND TRADEMARK OFFICE
CERTIFICATE OF CORRECTION

PATENT NO. : 10,160,860 B2  
APPLICATION NO. : 14/879731  
DATED : December 25, 2018  
INVENTOR(S) : Felix Koch, Philipp Harder and Botho Hoffmann Page 1 of 1

It is certified that error appears in the above-identified patent and that said Letters Patent is hereby corrected as shown below:

In the Specification

In Column 9, delete Lines 1-27 (Table 3)  
In Column 9, insert Lines 1-27 (Table 3)

Table 3:

| Composition | Unit | IE7 | CE5 | IE8 | CE6 | IE9 | CE7 | IE10 |
|---|---|---|---|---|---|---|---|---|
| PA A (612) | % by wt. | | | 37.5 | | 30 | | 37.5 |
| PA E (610) | % by wt. | 37.5 | | | | | | |
| PA C (66) | % by wt. | | 37.5 | | 30 | | 37.5 | |
| PA F (MXD6) | % by wt. | 12.5 | 12.5 | 12.5 | 10 | 10 | | |
| PA G (DI/DT) | % by wt. | | | | | | 12.5 | 12.5 |
| Glass fibre | % by wt. | 50 | 50 | 50 | 60 | 60 | 50 | 50 |
| Properties | | | | | | | | |
| Tensile modulus of elasticity | GPa | 16.1 | 18.1 | 16.0 | 22.4 | 20.8 | 18 | 16.2 |
| Tensile strength at break | MPa | 232 | 261 | 230 | 268 | 249 | 255 | 230 |
| Elongation at Break | % | 2.8 | 2.4 | 2.9 | 2.0 | 2.5 | 2.6 | 3.0 |
| Impact resistance at 23°C | kJ/m$^2$ | 95 | 90 | 100 | 80 | 92 | 70 | 95 |
| Notched impact resistance at 23°C | kJ/m$^2$ | 21 | 20 | 22 | 16 | 19 | 14 | 21 |
| Water absorption (23°C, 100% rel. humidity) | % | 2.2 | 4.0 | 1.9 | 3.4 | 1.6 | 4.1 | 2.0 |

\-\-                                                                                                      \-\-

Signed and Sealed this  
Second Day of April, 2019

Andrei Iancu  
*Director of the United States Patent and Trademark Office*